(12) United States Patent
Pastorelli et al.

(10) Patent No.: US 7,949,717 B2
(45) Date of Patent: May 24, 2011

(54) METHOD, SYSTEM AND COMPUTER PROGRAM FOR CORRECTING E-MAIL MESSAGES WITH MISSING RECEIVERS

(75) Inventors: Bernardo Pastorelli, Settembre (IT); Sandro Piccinini, Rome (IT)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 12/124,547

(22) Filed: May 21, 2008

(65) Prior Publication Data

US 2008/0294738 A1     Nov. 27, 2008

(30) Foreign Application Priority Data

May 22, 2007 (EP) .................................. 07108667

(51) Int. Cl.
*G06F 13/00* (2006.01)
(52) U.S. Cl. ................... 709/206; 709/219; 709/223
(58) Field of Classification Search .................. 709/204, 709/206, 217, 219, 223
See application file for complete search history.

(56) References Cited

U.S. PATENT DOCUMENTS

| | | | | |
|---|---|---|---|---|
| 6,988,129 B2 * | 1/2006 | Quine | ............................ | 709/206 |
| 7,222,156 B2 * | 5/2007 | Gupta et al. | .................. | 709/206 |
| 7,792,911 B2 * | 9/2010 | Wilson | ........................... | 709/206 |
| 2002/0194278 A1 | 12/2002 | Golan | | |
| 2004/0181586 A1 | 9/2004 | Morreale | | |
| 2005/0182954 A1 * | 8/2005 | Decuir | ........................... | 713/189 |
| 2007/0106731 A1 | 5/2007 | Bhakta | | |
| 2008/0288597 A1 * | 11/2008 | Christensen et al. | .......... | 709/206 |

FOREIGN PATENT DOCUMENTS

EP     0800144     10/1997

OTHER PUBLICATIONS

IP Australia; Office action dated Nov. 16, 2010.

* cited by examiner

*Primary Examiner* — Viet Vu
(74) *Attorney, Agent, or Firm* — Jeffrey S. LaBaw

(57) ABSTRACT

A solution is proposed for exchanging messages (such as e-mails) among a plurality of data processing entities, such as client computers (105). A corresponding method starts with the step of sending (403-412) an original message from a sender entity to a set of original receiver entities; the original message includes an original information content and an indication of the original receiver entities. The method continues by sending (415-424) a correction message from the sender entity at least partially to the original receiver entities and completely to a set of missing receiver entities being missing in the original message; the correction message includes the original information content and an indication of the original receiver entities and the missing receiver entities. The original message for each original receiver entity is then corrected (427-496) according to the correction message.

18 Claims, 8 Drawing Sheets

METHOD, SYSTEM AND COMPUTER PROGRAM FOR CORRECTING E-MAIL MESSAGES WITH MISSING RECEIVERS

FIELD OF THE INVENTION

The present invention relates to the data processing field. More specifically, the present invention relates to the exchange of messages (for example, e-mails) in a data processing system.

BACKGROUND

Electronic mail (abbreviated to e-mail) services have become increasingly popular in recent years (for either personal or business applications). These services allow exchanging electronic messages (referred to as e-mail messages, or simply e-mails) between users of computers over a communication network. Some (private) e-mail services are used to exchange information within a specific organization, such as a company; however, the e-mail services have become very popular especially thanks to the Internet, which makes it possible to communicate anywhere in the world. The e-mails allow conveying information in a direct and immediate way; this provides a communication channel that is fast, flexible and reliable.

However, the widespread use of the e-mails has brought about some problems. Indeed, the very low cost of sending e-mails (being substantially free of charge when a corresponding connection to the Internet is already established) facilitates their proliferation; as a result, a huge number of e-mails is sent every day by most users.

Moreover, the simplicity of the operations required to manage the e-mails makes their execution faster and faster; this is particularly true for expert users, which tend to perform those operations almost mechanically.

However, all of the above reduces a level of attention that is paid to the management of the e-mails. As a result, errors routinely occur when e-mails are composed, sent, received or stored.

Particularly, a typical problem arises when an e-mail is sent by a sender user (or simply sender) to a list of receiver users (or simply receivers). Indeed, in this case one or more of the desired receivers may be missing in the e-mail. Typically, this happens when the sender forgets inserting them into the e-mail; the same problem is experienced when their addresses are misprinted.

Once the sender becomes aware of the error (for example, because s/he notices the missing receivers in the e-mail that was sent or because s/he receives a failure message for the receivers with the misprinted addresses), two options are available to solve the problem.

A first possibility is of forwarding the same e-mail to the missing receivers. However, in this case the (original) receivers of the e-mail do not have any indication of the missing receivers. Therefore, the error is propagated when the original receivers reply to the (original) e-mail automatically, by means of a function commonly available to respond to all the users indicated in an e-mail; indeed, the (reply) e-mail is now sent only to the sender and to the other original receivers (but not to the missing receivers).

An alternative possibility is of sending a new e-mail (with the same information) to all the receivers (i.e., the original ones and the missing ones). Conversely, in this case the original receivers are provided with the same e-mail twice, so that they have to replace the wrong one with the correct one. However, this is quite annoying for the original receivers.

Moreover, very often the original receivers discard the new e-mail (since it is faster than storing it again in place of the original one); therefore, the same problems pointed out above are now experienced by these original receivers.

In both cases, this may cause the loss of valuable information for users that were instead intended to receive it. The problem is particular acute in business applications—for example, when the e-mails relate to information requests, task assignments, and the like.

SUMMARY

In its general terms, the present disclosure is based on the idea of correcting the messages with the addition of the missing receivers.

Particularly, different aspects of the invention provide a solution as set out in the independent claims. Advantageous embodiments of the invention are set out in the dependent claims.

More specifically, an aspect of the invention proposes a method for exchanging messages (such as e-mails) among a plurality of data processing entities (such as client computers). The method starts with the step of sending an original message from a sender entity to a set of original receiver entities; the original message includes an original information content and an indication of the original receiver entities. The method continues by sending a correction message from the sender entity at least partially to the original receiver entities and completely to a set of missing receiver entities being missing in the original message; the correction message includes the original information content and an indication of the original receiver entities and the missing receiver entities. The original message for each original receiver entity is then corrected according to the correction message.

In an embodiment of the invention, the correction is performed by adding an indication of the missing receiver entities to the original message.

In a proposed implementation, a reduced version of the correction message (being obtained by removing the original information content, or at least a part thereof) is sent to the original receiver entities.

Typically, the original message to be corrected is identified according to a corresponding identifier that is included in the correction message.

Preferably, the correction of the original message is performed on each original receiver entity (wherein the original message has been received).

As a further improvement, a reading indicator (being asserted when the original message is read) is deasserted in response to its correction.

Moreover, it is also possible to display the corrected message with an indication of the original receiver entities and of the missing receiver entities in different visual modes.

The same process may also be reiterated for any reply message (that was sent as a reply to the original message before its correction).

Typically, the proposed solution is applied to e-mail messages.

Another aspect of the invention proposes a computer program for performing the above-described method.

A further aspect of the invention proposes a corresponding system.

A still further aspect of the invention proposes a data processing entity (such as a client computer) for use in this system.

BRIEF DESCRIPTION OF THE DRAWINGS

The invention itself, as well as further features and the advantages thereof, will be best understood with reference to the following detailed description, given purely by way of a non-restrictive indication, to be read in conjunction with the accompanying drawings, in which.

DETAILED DESCRIPTION

Figure 1:
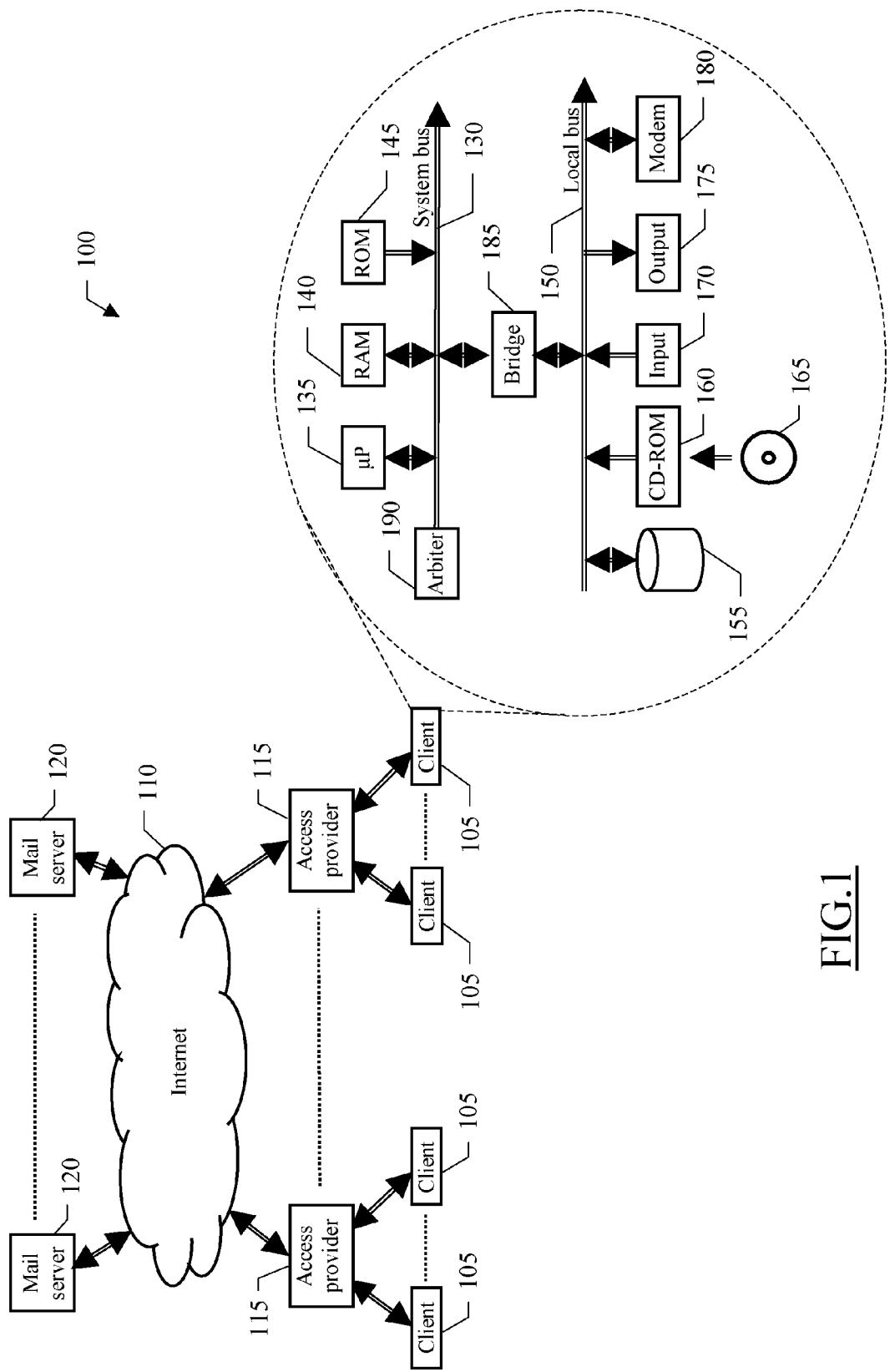
FIG. 1 is a high-level overview of a data processing system in which the solution according to an embodiment of the invention is applicable.

With reference in particular to FIG. 1, a data processing system 100 with distributed architecture is shown. The system 100 includes multiple client computers 105 (or simply clients). The clients 105 access a network 110 (for example, consisting of the Internet) through other computers 115 directly connected thereto, which computers 115 operate as access providers. For this purpose, each client 105 dials a selected access provider 115 (wherein it is registered); the client 105 can then send and receive information and/or command over the Internet 110 through the corresponding access provider 115. This allows the clients 105 to exploit different services that are offered by one or more server computers 120 of the Internet 110.

Each client 105 generally consists of a Personal Computer (PC). In detail, the client 105 is formed by several units that are connected in parallel to a system bus 130. Particularly, a microprocessor (μP) 135 controls operation of the client 105; a RAM 140 is directly used as a working memory by the microprocessor 135, and a ROM 145 stores basic code for a bootstrap of the client 105. Several peripheral units are clustered around a local bus 150 (by means of respective interfaces). Particularly, a mass memory consists of a hard-disk 155 and a drive 160 for reading CD-ROMs 165. Moreover, the client 105 includes input units 170 (for example, a keyboard and a mouse), and output units 175 (for example, a monitor and a printer). A Modem 180 (for example, of the ADSL type) is used to connect the client 105 to the corresponding access provider 115 (and then to the Internet 110). A bridge unit 185 interfaces the system bus 130 with the local bus 150. The microprocessor 135 and the bridge unit 185 can operate as master agents requesting an access to the system bus 130 for transmitting information. An arbiter 190 manages the granting of the access with mutual exclusion to the system bus 130.

As pointed out above, the servers 120 may offer a number of services. In the specific case of an embodiment of the present invention, the servers 120 implement an e-mail service, which allows users of the clients 105 to send and receive e-mails. Generally speaking, an e-mail is a message that is transmitted from a sender user (or simply sender) to one or more receiver users (or simply receivers) by means of the corresponding clients 105 over the Internet 110; for this purpose, each (sender/receiver) user is identified by a corresponding address, which consists of a unique personal username in the domain of an associated mail server 120, being followed by the symbol "@" and a domain name of the associated mail server 120 (such as "MyName@MyDomain"). The e-mail is used to convey a variety of information to the receivers. For example, the information consists of text, images, and the like; moreover, it is also possible to add one or more attachments in the form of external files.

In the Internet 110, the format of the e-mails is defined by the Multipurpose Internet Mail Extensions (MIME) standard. Briefly, each e-mail consists of a header section and a body section (separated by a blank line). The header section defines the e-mail by means of corresponding header fields; each header field consists of a name/value pair, being composed by a field name and a field value separated by the symbol ":". A set of predefined header fields is specified in the MIME standard; optional header fields (with the header names different from the ones reserved to the MIME standard) may also be used for conveying custom information (with the optional header fields that are simply discarded when they are not supported).

More specifically, the header section includes an identifier of the e-mail (field name "Message-ID:"). The identifier consists of a global unique value (as guaranteed by the mail server 120 associated with the sender); for example, the identifier of the e-mail is formed by the current absolute date and time of its processing by the mail server 120, followed by the symbol "@" and the domain name of the mail server 120 (such as "MyTime@MyDomain"). The header section also provides the address and possibly the name of the sender (field name "From:"), the address and possibly the name of one or more receivers (field name "To:"); other header fields may indicate carbon copy receivers (field name "Cc:") or undisclosed carbon copy receivers (field name "Ccn:"). The header section then includes a topic of the e-mail (field name "Subject:"), its type of display (field name "Content-Type:"), the name of any attachment (field name "Attachment:"), a corresponding date and time (field name "Date:"), and the like. On the other hand, the body section includes its content (i.e., text and/or images); typically, the body section ends with a signature of the sender.

Whenever a sender needs to send an e-mail to specific receivers, the e-mail (once formatted according to the MIME standard) is transmitted to the associated mail server 120 by means of the Simple Mail Transfer Protocol (SMTP). The mail server 120 in turn extracts the address of each receiver (from the SMTP protocol and not from the header section) to which the e-mail message must be delivered. The mail server 120 exploits a system of Domain Name Servers (DNS) of the Internet 110 to convert the domain name of the mail server 120 associated with each receiver into the physical location of the mail server 120, to which the e-mail is then transmitted (using the SMTP protocol). All the e-mail messages received by any user are stored in a corresponding electronic mailbox on the associated mail server 120. The user can fetch the received e-mails onto his/her client 105 by means of the Post Office Protocol (POP3).

Figure 2A:
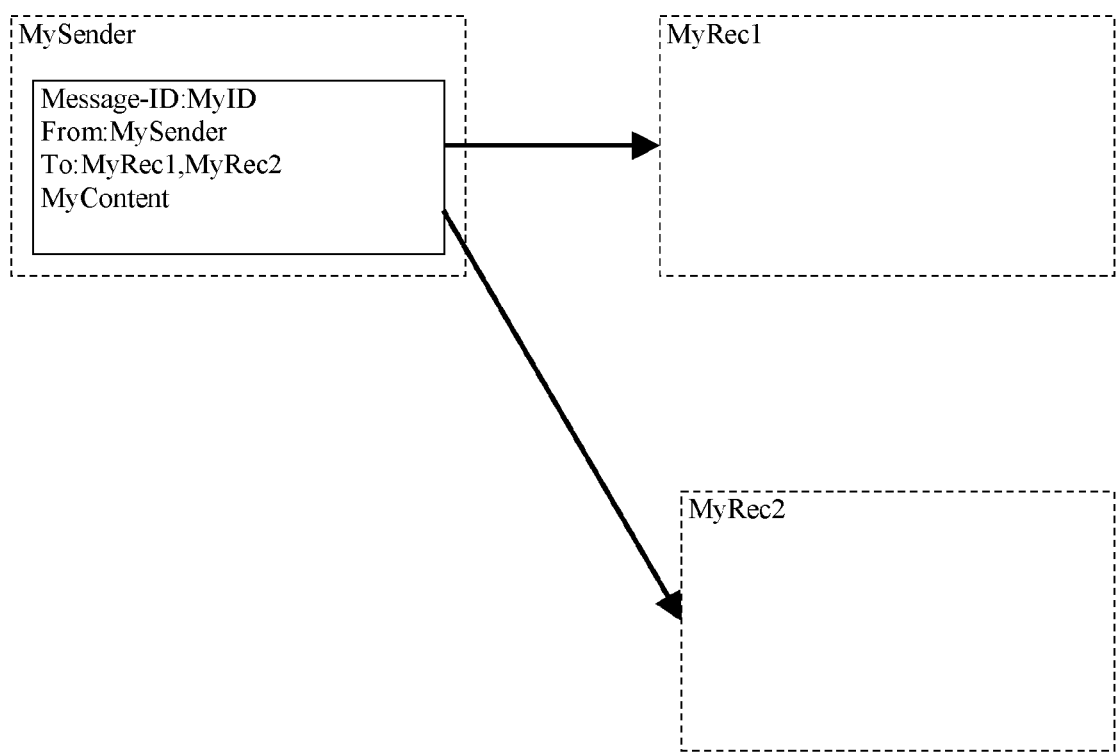
FIGS. 2A-2D show an exemplary application of the solution according to an embodiment of the present invention.

An exemplary application of the above-described e-mail service is illustrated in FIGS. 2A-2D. With reference in particular to FIG. 2A, let us consider that a generic sender "MySender" wishes to send an e-mail to one or more receivers (such as the receivers "MyRec1" and "MyRec2" in the example at issue). The e-mail has a corresponding identifier "MyID" (header field "Message-ID:MyID"); the header section also indicates that the e-mail is sent from the sender "MySender" (header field "From:MySender") to the receivers "MyRec1" and "MyRec1" (header field "To:MyRec1, MyRec1"). The information content of the e-mail (to be delivered to the receivers) is generically denoted with "MyContent"; for example, the information content includes the topic of the e-mail and any attachments (as indicated in the corresponding header fields), together with its body section.

Figure 2B:
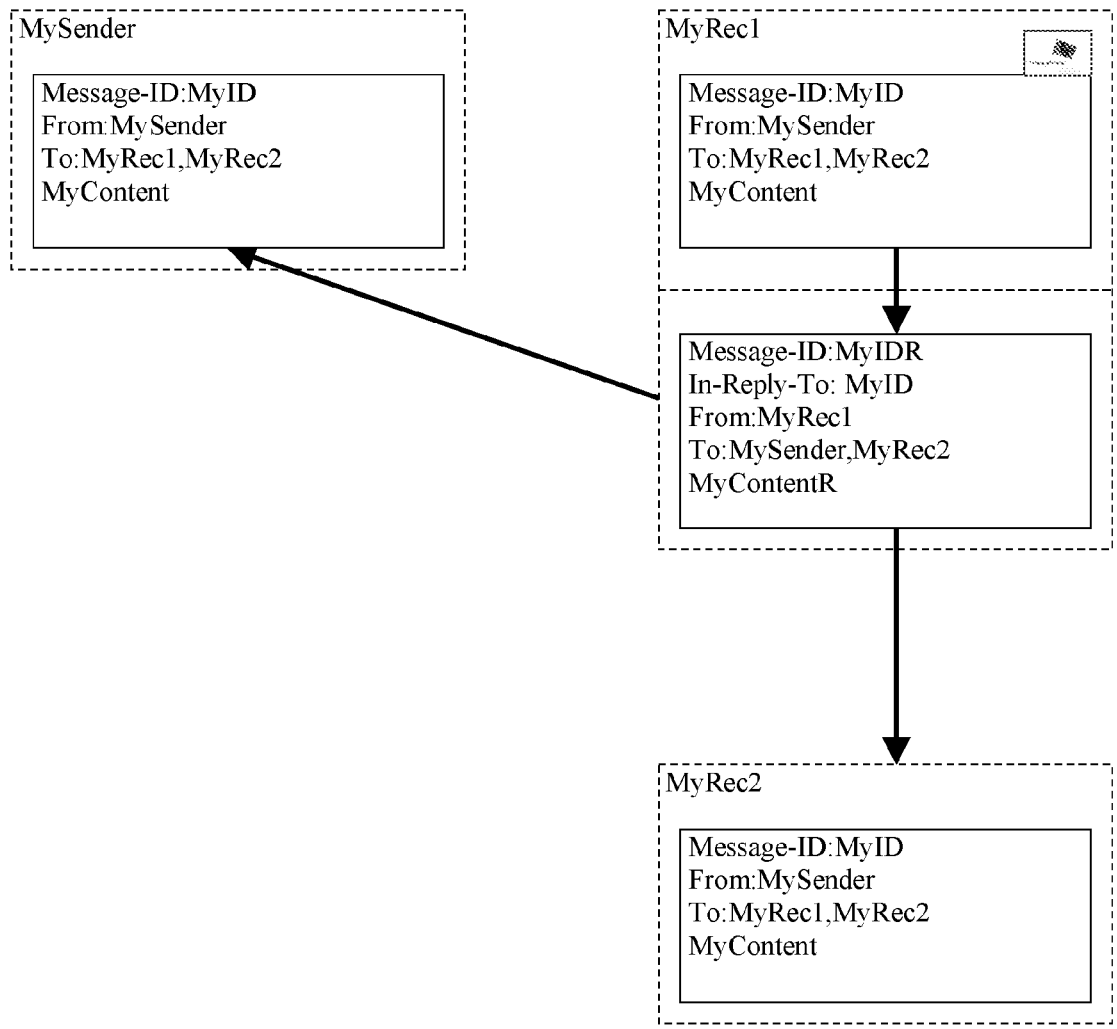

The above-described e-mail is received, as shown in FIG. 2B, by its receivers "MyRec1" and "MyRec2". Each receiver, such as the receiver "MyRec1", can then open and read the e-mail; typically, once the e-mail has been read a corresponding indicator is set (for example, with a small green flag that is displayed close to the e-mail). The receiver "MyRec1" may also decide to reply to the e-mail. For this purpose, the receiver "MyRec1" usually exploits a reply-to-all function that allows creating a (reply) e-mail repeating the content of the (parent) e-mail to which s/he wants to reply; the reply e-mail is automatically addressed to all the other (sender and receiver) users indicated in the parent e-mail. The reply e-mail has a corresponding identifier "NMyIDR" (header field "Message-ID:MyIDR"). An additional header field (field name "In-Reply-To:") is used to indicate the parent e-mail with the identifier "MyID" (header field "In-Reply-To:MyID"). The reply e-mail is sent from the receiver "MyRec1" (header field "From:MyRec1") to the other users "MySender" and "MyRec2" (header field "To:MySender, MyRec2"). The information content of the e-mail (generally including additional information with respect to the information content of the parent e-mail) is denoted as a whole with "MyContentR".

Figure 2C:
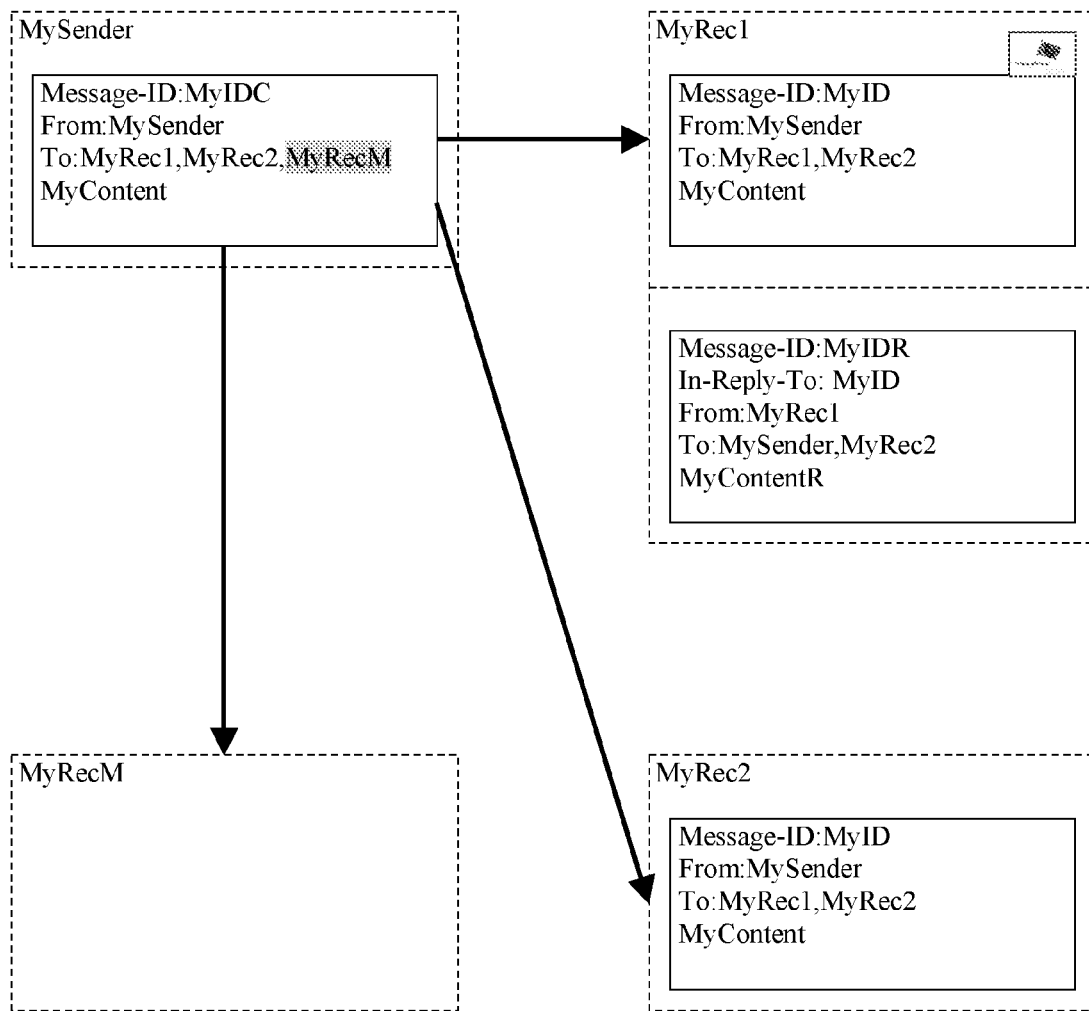

Moving to FIG. 2C, let us assume now that the sender "MySender" realizes that the (original) e-mail sent to the (original) receivers "MyRec1" and "MyRec2" was also to be sent to one or more missing receivers (such as the missing receiver "MyRecM"). In the solution according to an embodiment of the present invention, in this case a correction e-mail is created. The correction e-mail includes the same information content of the original e-mail, but it is addressed to all the desired receivers (i.e., both the original ones and the missing ones). The correction e-mail is sent to the missing receivers as usual. The correction e-mail (or at least a part thereof) is also sent to the original receivers; in this case, the correction e-mail is used to correct the original e-mail (so as to add the missing receivers).

The proposed solution ensures that every receiver gets the correct e-mail (with the indication of all the receivers). In this way, it is possible to prevent any further error caused by the reply to the original e-mail by the original receivers (once the original e-mail has been corrected).

The desired result is achieved automatically, without requiring any manual intervention by the original receivers.

In this way, it is possible to avoid (or at least strongly reduce) any loss of valuable information for users that were instead intended to receive it. This advantage is clearly perceived in business applications (even if the use of the same solution in personal applications is not excluded).

In the example at issue, the correction e-mail (which replaces the original e-mail on the sender "MySender") has a corresponding identifier "NMyIDC" (header field "Message-ID:MyIDC"). An optional header field (for example, defined by the field name "Replace:") is used to indicate the original e-mail with the identifier "MyID" that is replaced (header field "Replace:MyID"). The correction e-mail is sent from the sender "MySender" (header field "From:MySender") to all the receivers "MyRec1", "MyRec2" and "MyRecM" (header field "To:MyRec1,MyRec2,MyRecM"). The information content of the e-mail is equal to the one of the original e-mail (i.e., "MyContent").

Preferably, the differences between the correction e-mail and the original e-mail (i.e., the added missing receivers) are highlighted on the sender "MySender"; in the example at issue, the desired result is achieved by displaying the address (and possibly the name) of the missing receiver "MyRecM" with a colored background. This additional feature facilitates the identification of the correction performed on the original e-mail.

Figure 2D:
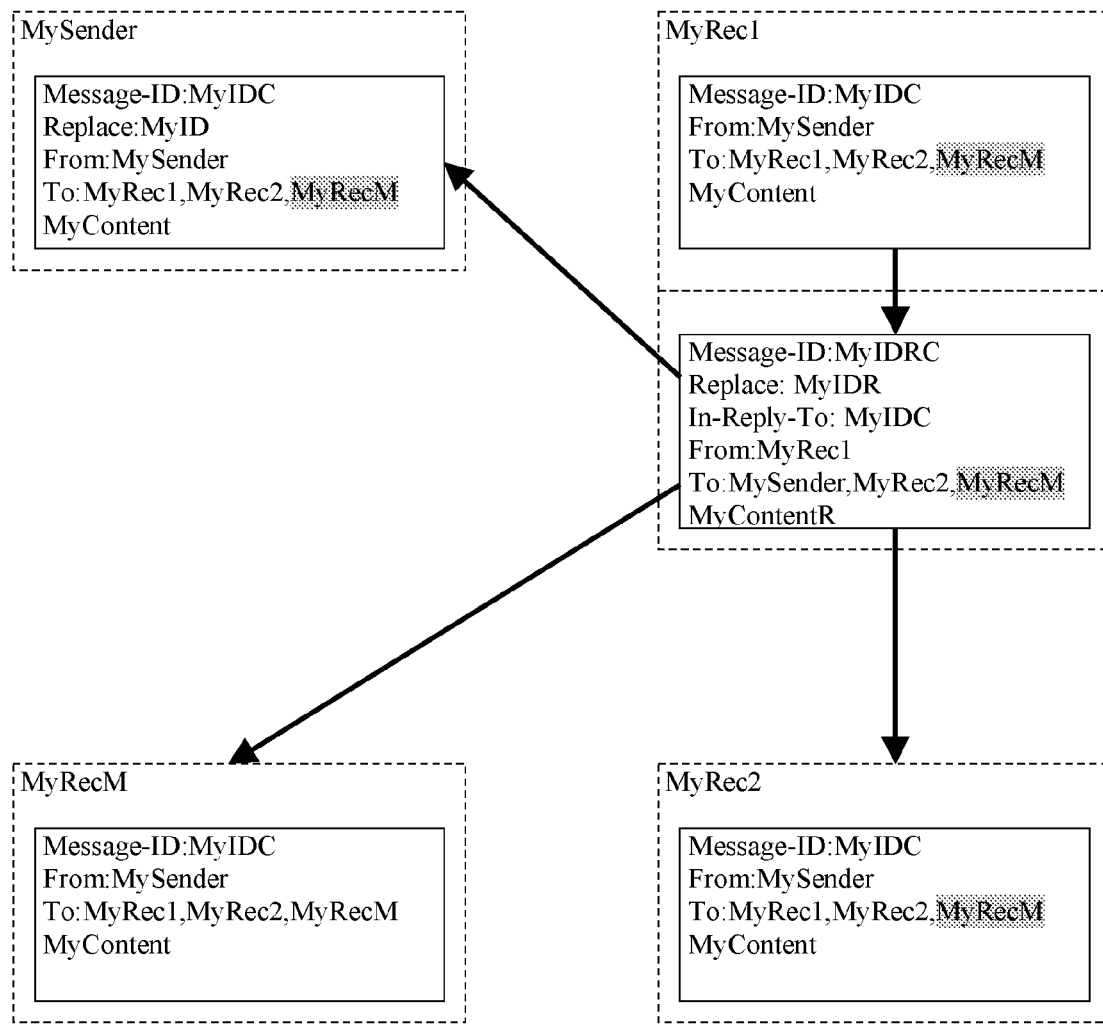

Moving to FIG. 2D, each missing receiver (i.e., the receiver "MyRecM" in the example at issue) receives the correction e-mail from the sender "MySender" as described above. Conversely, each original receiver (i.e., the receivers "MyRec1" and "MyRec2") simply corrects the original e-mail (as identified in the header field "Replace:") according to the correction e-mail. For this purpose, as shown in the figure, the original e-mail is replaced by the correction e-mail (with the identifier "NMyIDC"); alternatively, it is possible to add the missing receiver "MyRecM" to the original e-mail (with the identifier "MyID").

Preferably, when the original e-mail has already been read—such as on the original receiver "MyRec1"—the corresponding reading indicator is reset (for example, by removing the flag). In this way, it is possible to draw the attention of the original receiver "MyRec1" to the correction that was performed on the original e-mail.

As above, the differences between the corrected e-mail and the original e-mail (i.e., the added missing receivers) are highlighted, so as to further facilitate the identification of the correction performed on the original e-mail.

The same correction is also propagated for each original receiver that has already replied to the original e-mail; in this case, a further correction e-mail is used to correct the reply e-mail. The proposed solution ensures that any error caused (either directly or indirectly) by the original e-mail is corrected automatically (so as to avoid any loss of information).

In the example at issue, as described above, the original receiver "MyRec1" has sent the reply e-mail with the identifier "NMyIDR" to the other users "MySender" and "MyRec2". Its correction e-mail has a corresponding identifier "MyIDCR" (header field "Message-ID:MyIDCR"). The optional header field is now used to indicate the reply e-mail with the identifier "MyIDR" that is replaced (header field "Replace:MyIDR"). The correction e-mail is a reply to the (corrected) parent e-mail with the identifier "MyIDC" (header field "In-Reply-To:MyIDC"). The correction e-mail is sent from the receiver "MyRec1" (header field "From: MyRec1") to all the other users "MySender", "MyRec2" and "MyRecM" (header field "To:MySender,MyRec2, MyRecM"). The information content of the correction e-mail is equal to the one of the reply e-mail (i.e., "MyContentR"). Preferably, the differences between the correction e-mail and the (original) replay e-mail (i.e., the added missing receivers) are again highlighted.

The same operations described above and then repeated on each receiver of this correction e-mail (with the possible generation in turn of still further correction e-mails).

Figure 3:
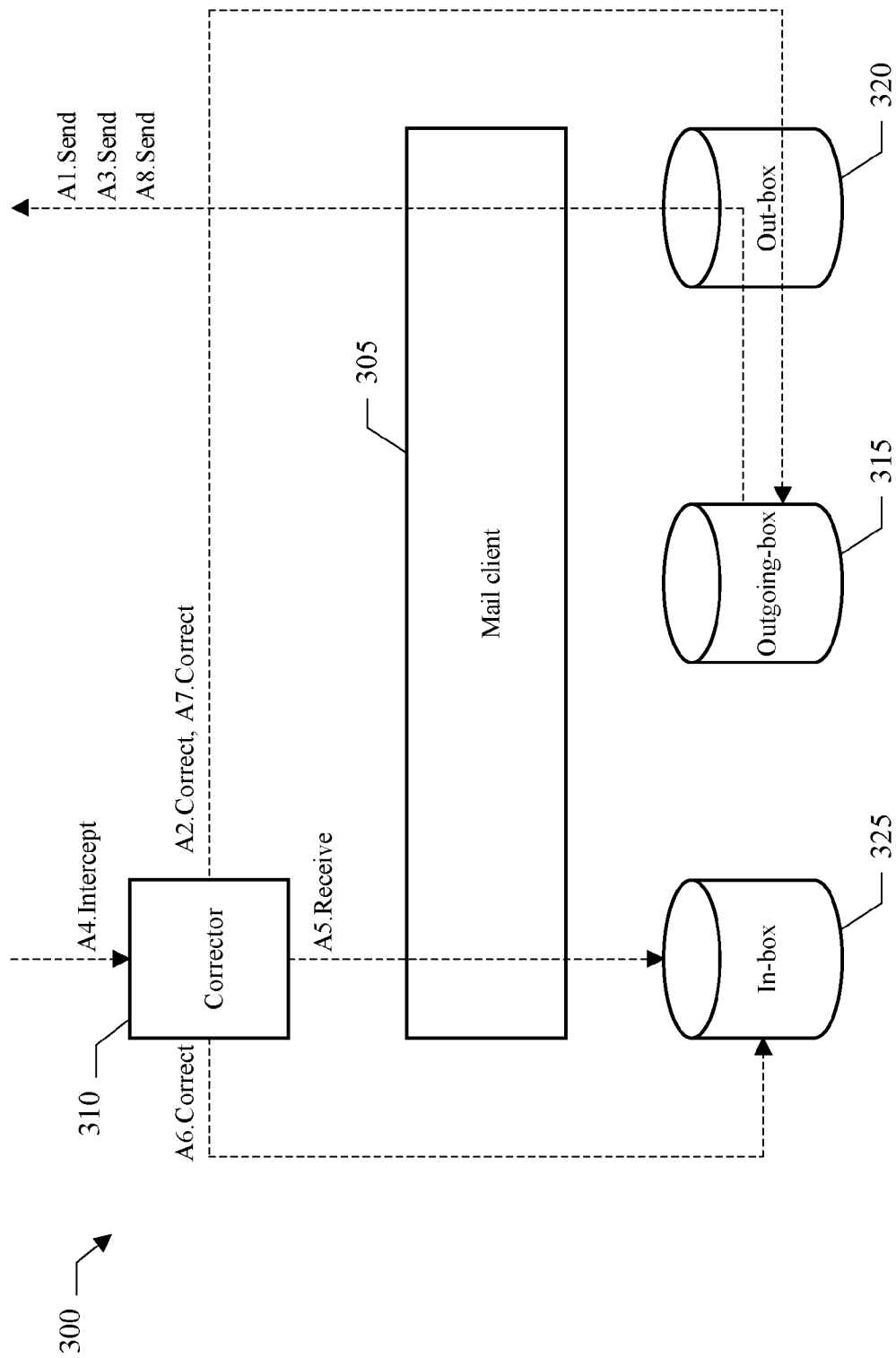
FIG. 3 is a collaboration diagram representing the roles of different software components that may be used to implement the solution according to an embodiment of the invention.

With reference now to FIG. 3, the main software components that may be used to implement the above-described solution on a generic client are denoted as a whole with the reference 300. The information (programs and data) is typically stored on the hard-disk and loaded (at least partially) into the working memory of the client when the programs are running, together with an operating system and other application programs (not shown in the figure). The programs are initially installed onto the hard disk, for example, from CD-ROM. Particularly, the figure describes the static structure of the system (by means of the corresponding components) and its dynamic behavior (by means of a series of exchanged messages, each one representing a corresponding action, denoted with sequence numbers preceded by the symbol "A").

In detail, a mail client 305 is used to compose, send, receive and store the e-mails locally; an example of commercial mail client 305 available on the market is the "Lotus Notes" by IBM Corporation. In the solution according to an embodiment of the present invention, a dedicated plug-in 310 (hereinafter referred to as corrector) is added to the mail client 305 for managing the above-described correction of the e-mails (which were not sent by mistake to all the desired receivers).

As usual, any new outgoing e-mail is placed into an outgoing-box 315; the mail client 305 then sends the outgoing e-mail to the receivers indicated in its header section and moves it to an out-box 320 (action "A1.Send"). When an original e-mail was sent (and then stored in the out-box 320) without one or more missing receivers, the corrector 310 creates a corresponding correction e-mail; the correction e-mail is placed into the outgoing-box 315, at the same time removing the original e-mail from the out-box 320 (action "A2.Correct"). In this way, the mail client 305 as usual sends the correction e-mail in the outgoing-box 315 to all its (original and missing) receivers and moves it to the out-box 320 (action "A3.Send").

Whenever the client receives a new ingoing e-mail, the event is intercepted by the corrector 310 (action "A4.Intercept"). For this purpose, the corrector 310 includes an agent continuously running in the background (not shown in the figure), which agent detects the receipt of any ingoing e-mail (for example, by means of hooking techniques). When the ingoing e-mail is not a correction e-mail, the corrector 310 forwards it to the mail client 305; as a result, the (standard) ingoing e-mail is received as usual and then added to an in-box 325 (action "A5.Receive").

Conversely, when the ingoing e-mail is a correction e-mail the corrector 310 corrects the corresponding original e-mail in the in-box 325 accordingly (action "A6.Correct"). Moreover, the corrector 310 verifies whether the out-box 320 includes any reply e-mail that was sent in response to the same original e-mail. If so, a corresponding further correction e-mail is created, as a reply to the same parent e-mail as corrected; this correction e-mail is added to the outgoing-box 315, at the same time removing the reply e-mail from the out-box 320 (action "A7.Correct"). As above, the mail client 305 then sends the correction e-mail in the outgoing-box 315 to all its (original and missing) receivers and moves it to the out-box 320 (action "A8.Send").

Figure 4A:
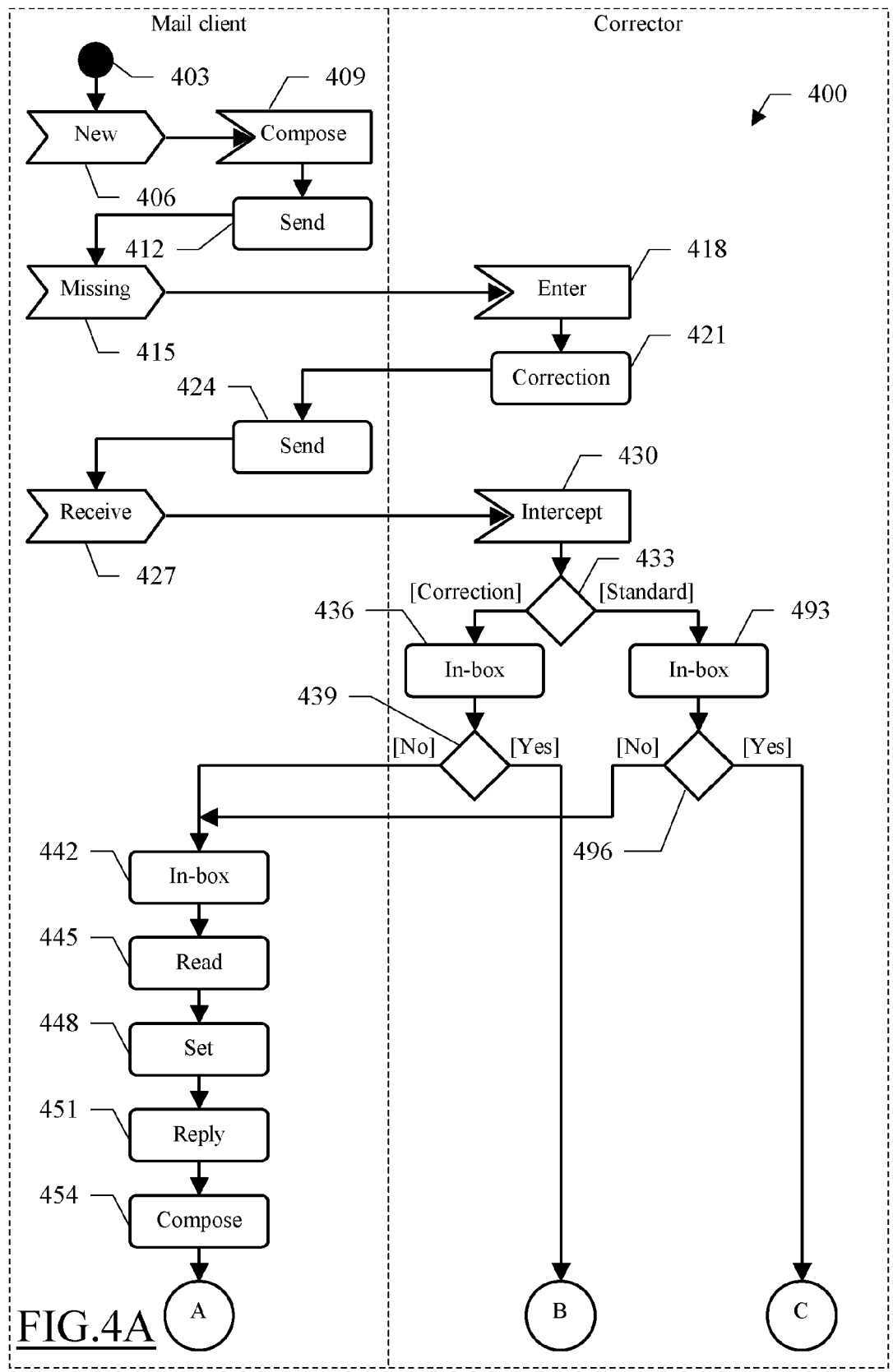
FIGS. 4A-4B show a diagram describing the flow of activities relating to an implementation of the solution according to an embodiment of the invention.
Figure 4B:
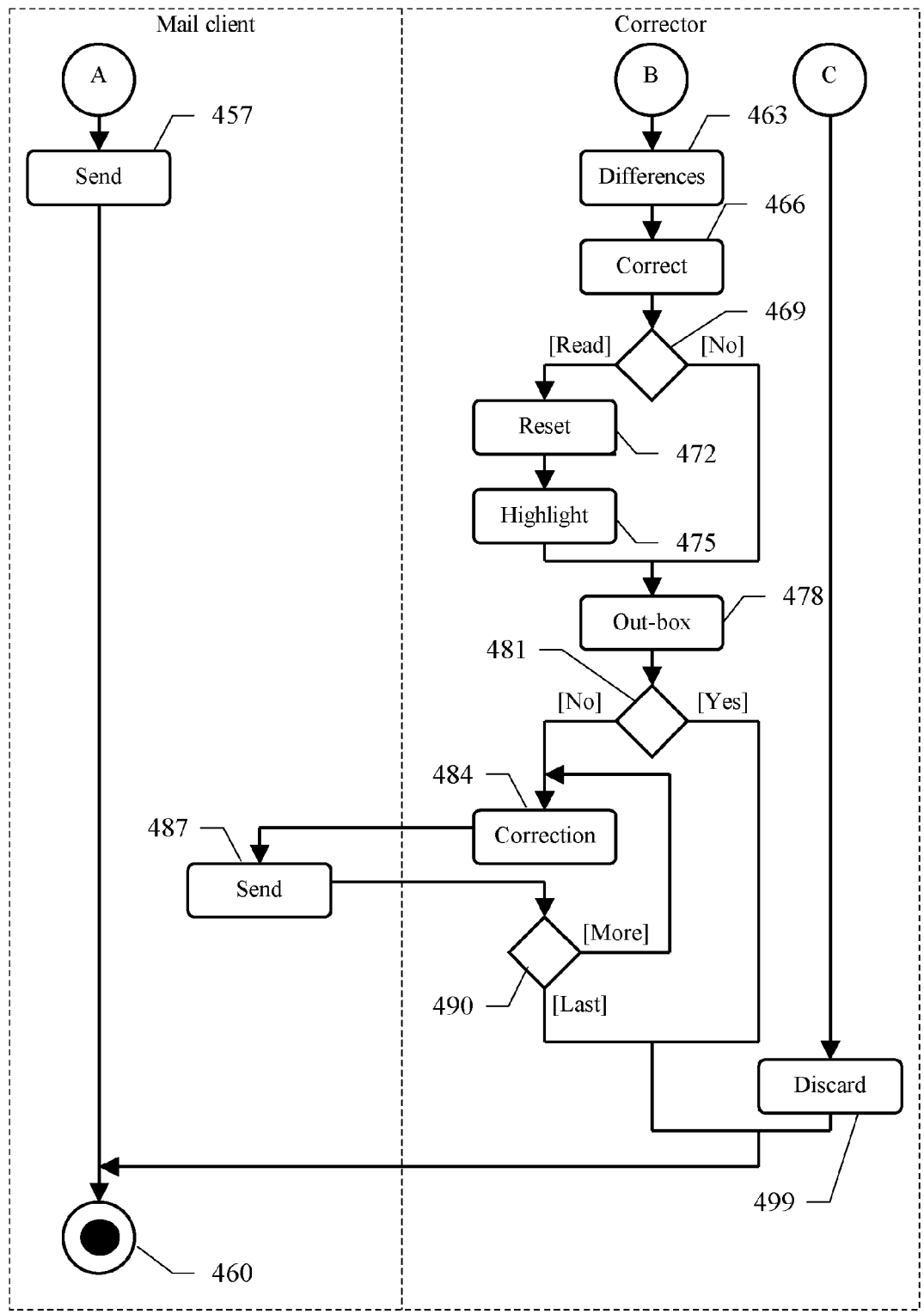

Considering now FIGS. 4A-4B, the logic flow of an exemplary process that can be implemented in the above-described client to correct e-mails with missing receivers is represented with a method 400.

The method begins at the black start circle 403 in the swim-lane of the mail client, and the passes to block 406 as soon as the user of the client wishes to send a new e-mail. In response thereto, the user composes the desired e-mail at block 409, by exploiting a Graphical User Interface (GUI) that is provided by the mail client. For this purpose, the user types the topic of the e-mail (in a "Subject" input field) and its text (in a "Body" frame); the user then adds the desired receivers (in a "To" input field)—for example, by typing their addresses or by selecting them from an address book. The e-mail so obtained is then sent to the indicated receivers at block 412 (for example, by clicking with the mouse on a corresponding button).

Moving to block 415, the user realizes that the (original) e-mail sent to the (original) receivers was also to be sent to one or more other missing receivers. Therefore, the user selects the original e-mail in the out-box and then invokes a correction command offered by the corrector (for example, by selecting a corresponding command in a pull-down menu of a pop-up window being used to display the original e-mail once selected). In response thereto, the corrector at block 418 prompts the user to enter the missing receivers (in a further "To" input field). Continuing to block 421, the corrector composes the correction e-mail by copying the original e-mail and then adding the missing receivers; the correction e-mail is placed into the outgoing-box, at the same time removing the original e-mail from the out-box. Returning to the swim-lane of the mail client, the correction e-mail is then sent to all the (original and missing) receivers at block 424.

Particularly, the correction e-mail is always sent completely to the missing receivers. Conversely, the correction e-mail may be sent either completely or only in a reduced version to the original receivers; the reduced correction e-mail is discriminated from its complete version by the addition of a further optional header field (for example, "Reduced: Yes"). The reduced correction e-mail includes the information required to identify the corresponding original e-mail (i.e., its identifier in the header field "Replace:") and to correct it (i.e., the missing receivers in the header field "To:"). The other information (such as the body section and the attachments) may instead be removed, since it is already available to the original receivers (being included in the original e-mail as well). In this way, it is possible to avoid any repeated transmission of the same information (with a beneficial impact on the network traffic).

The method then descends into block 427 as soon as the client receives a new ingoing e-mail. The event is intercepted by the corrector at block 430. The flow of activity now branches at block 433 according to the type of the ingoing e-mail.

Particularly, when a correction e-mail is received (as indicated by the header field "Replace:"), the corrector at block 436 searches the corresponding original e-mail (with the identifier indicated in the header field "Replace:" of the correction e-mail) in the in-box.

If the original e-mail is not found at the decision block 439 (meaning that the original e-mail has not been received yet by an original receiver or that the correction e-mail has been received by a missing receiver), the flow of activity passes to block 442; in this phase, the (correction) e-mail is added to the in-box as usual. Continuing to block 445, the user of the client may open and read this e-mail. Accordingly, the corresponding reading indicator is set at block 448 (by displaying the flag). With reference now to block 451, the user of the client may also decide to reply to the e-mail with the reply-to-all function (for example, by selecting a corresponding command in a pull-down menu of a pop-up window that is opened when the e-mail is selected in the out-box). In response thereto, a new (reply) e-mail is automatically created at block 454, by repeating the topic and the body of the parent e-mail (in the "Subject" input field and in the "Body" frame, respectively), and by inserting the other (sender and receiver) users of the parent e-mail (in the "To" input field); the user then completes the reply e-mail by inserting a response to the parent e-mail in the same "Body" frame (and possibly any additional receiver in the "To" input field). The e-mail so obtained is then sent to the indicated receivers at block 457. The method now descends into the concentric white/black stop circles 460.

Returning to block 439, when the original e-mail for the correction e-mail just received is found in the in-box, the method continues to block 463; in this phase, the missing receivers to be added to the original e-mail (determined by comparing the correction e-mail with the original e-mail) are saved. Proceeding to block 466, the original e-mail is then corrected according to the correction e-mail. Particularly, when the complete correction e-mail has been received (as indicated by the absence of the header field "Reduced:Yes"), the original e-mail in the in-box is replaced with the correction e-mail. Conversely, when the reduced correction e-mail has been received (including the header field "Reduced: Yes"), the original e-mail is updated by adding the missing receivers into its header field "To:".

A test is then made at block 469 to verify whether the original e-mail has already been read (as indicated by the corresponding reading indicator—managed by the mail client—being asserted). If so, the reading indicator is reset at block 472 (thereby deleting the flag). Continuing to block 475, the missing receivers (that were added to the corrected original e-mail) are highlighted. The method then descends into block 478; the same point is also reached from block 469 directly when the original e-mail has not been read yet.

The corrector now searches any reply e-mail to the original e-mail (with its identifier in the header field "In-Reply-To:") in the out-box.

If at least one reply e-mail is found at the decision block 481, a loop is performed for each reply e-mail. The loop begins at block 484, wherein the correction e-mail corresponding to the (current) reply e-mail is created. When the corrected e-mail was obtained by replacing the original e-mail with the correction e-mail, this further correction e-mail is obtained from the reply e-mail by adding the missing receivers in the header field "To:" and by replacing the identifier of the original e-mail with the one of the correction e-mail in the header field "In-Reply-To:"; conversely, when the corrected e-mail was obtained by updating the original e-mail, this further correction e-mail is obtained from the reply e-mail only by adding the missing receivers in the header field "To:" (with the identifier of the original e-mail that is maintained in the header field "In-Reply-To:"). The correction e-mail is then placed into the outgoing-box, at the same time removing the reply e-mail from the out-box. Returning to the swim-lane of the mail client, the correction e-mail is sent to all its receivers at block 487. The method then verifies at block 490 (in the swim-lane of the corrector) whether all the reply e-mails have been processed. If not, the flow of activity returns to the block 484 to repeat the same operations for a next reply e-mail. On the contrary, the method descends into the concentric white/black stop circles 460; the same point is also reached directly from block 481 when no reply e-mail to the original e-mail is found.

Returning to block 433, when a standard e-mail is received (without the header field "Replace:"), the corrector at block 493 searches the corresponding correction e-mail (with the identifier of the ingoing e-mail in its header field "Replace:") in the in-box.

If the correction e-mail is not found at the decision block 496 (meaning that the ingoing e-mail is correct or that the corresponding correction e-mail has not been received yet), the flow of activity continues to block 442 so as to process the ingoing e-mail as usual (as described above). Conversely (i.e., when the correction e-mail has been received before the corresponding original e-mail), the received e-mail is discarded at block 499—since it is superseded by the correction e-mail. The method then descends into the concentric white/black stop circles 460.

Naturally, in order to satisfy local and specific requirements, a person skilled in the art may apply to the solution described above many logical and/or physical modifications and alterations. More specifically, although the present invention has been described with a certain degree of particularity with reference to preferred embodiment(s) thereof, it should be understood that various omissions, substitutions and changes in the form and details as well as other embodiments are possible. Particularly, the proposed solution may even be practiced without the specific details (such as the numerical examples) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any disclosed embodiment of the invention may be incorporated in any other embodiment as a matter of general design choice.

Particularly, the proposed solution lends itself to be implemented with an equivalent method (by using similar steps, removing some steps being non-essential, or adding further optional steps); moreover, the steps may be performed in a different order, concurrently or in an interleaved way (at least in part).

Similar considerations apply if the e-mails are composed in any other way; for example, the (original and/or missing) receivers may be specified by means of a distribution list.

Of course, the above-described implementation based on the MIME standard must not to be interpreted in a limitative manner; for example, the same solution may also be put into practice by using different optional header fields, by exploiting existing header fields, or even by encoding specific information in the body section. Similar considerations apply to other e-mail services, even based on different protocols and/or formats (such as the "X.400" or any proprietary solution). Alternatively, the e-mails may be managed in a different way—for example, by means of local mail servers (directly connected to clients of a local network), by means of fat clients, by means of a "webmail" interface, and the like.

As pointed out above, the original e-mail may be corrected either by adding the missing receivers or by replacing it with the correction e-mail (or in any other equivalent manner).

Again, the correction e-mail may be sent either completely or only in part to the original receivers; in the latter case, the reduced version of the correction e-mail may be obtained by removing only the attachments, the attachments and the body section, or its whole information content (down to a reduced correction e-mail that only includes the identifier of the original e-mail and the missing receivers).

Nothing prevents identifying the original e-mail associated with the correction e-mail in a different way—even without the use of any optional header field (for example, by comparing their information contents).

Moreover, the possibility of correcting the original e-mail on the mail servers is not excluded (for example, when it has not been downloaded yet to the corresponding client).

Similar considerations apply if equivalent reading indicators are used for the e-mails that have already been read (for example, ticks with different colors, check boxes, and the like). However, the feature of resetting the reading indicator of the corrected original e-mail is not strictly necessary and it may be omitted in a simplified implementation of the invention.

The missing receivers being added to the original e-mail may be determined according to a comparison between the original e-mail and the correction e-mail, or they may even be extracted directly from the correction e-mail (when it is in the reduced version without the original receivers). In any case, the original receivers and the missing receivers may be differentiated in any other way in the pertinent e-mails (for example, with different fonts, colors, or any other visual mode). However, nothing prevents displaying all the receivers (i.e., both the original ones and the missing ones) in the same way.

Similar considerations apply mutatis mutandis to the correction of the reply e-mails. Alternatively, this function may be implemented in a different way (for example, being limited to a maximum level of the chain of reply e-mails, down to only the ones that are a direct reply to the original e-mail), or it may even be omitted at all.

Even though in the preceding description reference has been made to the e-mail service, this is not to be interpreted in a limitative manner. More generally, the same solution may also be applied to instant messaging services, to chat rooms, to news services, and more generally to any other computer-implemented service based on the exchange of whatever messages.

Similar considerations apply if the proposed solution is implemented with a different mail client. Alternatively, the ingoing e-mails may be intercepted in a different way (for example, by filtering the correction e-mails according to pre-defined keywords—such as in their subjects). In any case, nothing prevents customizing the mail client to support the proposed solution directly (without any dedicated plug-in).

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). In any case, the program may take any form suitable to be used by or in connection with any data processing system, such as external or resident software, firmware, or microcode (either in object code or in source code—for example, to be compiled or interpreted). Moreover, it is possible to provide the program on any computer-usable medium; the medium can be any element suitable to contain, store, communicate, propagate, or transfer the program. For example, the medium may be of the electronic, magnetic, optical, electromagnetic, infrared, or semiconductor type; examples of such medium are fixed disks (where the program can be pre-loaded), removable disks, tapes, cards, wires, fibers, wireless connections, networks, broadcast waves, and the like. In any case, the solution according to an embodiment of the present invention lends itself to be implemented with a hardware structure (for example, integrated in a chip of semiconductor material), or with a combination of software and hardware.

The proposed method may also be carried out on a system having a different topology or including equivalent units (down to a single mainframe supporting multiple users). Moreover, each computer may have another structure or may include similar elements (such as cache memories temporarily storing the programs or parts thereof to reduce the accesses to the mass memory during execution); in any case, it is possible to replace the computer with any code execution entity (such as a PDA, a mobile phone, and the like), or with a combination thereof (such as a client/server architecture, a grid computing infrastructure, and the like).

The invention claimed is:

1. A method for exchanging messages among a plurality of data processing entities, the method including the steps of:
    sending an original message from a sender entity to a set of original receiver entities, the original message including an original information content and an indication of the original receiver entities,
    sending a correction message from the sender entity at least partially to the original receiver entities and completely to a set of missing receiver entities being missing in the original message, the correction message including the original information content and an indication of the original receiver entities and the missing receiver entities, and
    correcting the original message for each original receiver entity according to the correction message.

2. The method according to claim 1, wherein the step of correcting the original message includes:
    adding an indication of the missing receiver entities to the original message.

3. The method according to claim 1, wherein the step of sending the correction message includes:
    sending a reduced version of the correction message to the original receiver entities, the reduced version being obtained from the correction message by removing at least part of the original information content.

4. The method according to claim 1, wherein the correction message further includes an identifier of the original message, the step of correcting the original message including:
    identifying the original message to be corrected according to the identifier included in the correction message.

5. The method according to claim 1, further including the step of:
    receiving the original message on each original receiver entity, the step of correcting the original message being performed on the original receiver entity.

6. The method according to claim 5, further including the steps of:
    reading the original message,
    asserting a reading indicator for the original message in response to the reading of the original message, and
    deasserting the reading indicator in response to the correction of the original message.

7. The method according to claim 5, further including the step of:
    displaying the corrected original message with an indication of the original receiver entities in a first visual mode and an indication of the missing receiver entities in a second visual mode different from the first visual mode.

8. The method according to claim 5, further including the steps of:
    sending a reply message as a reply to the original message from the original receiver entity to a set of reply receiver entities including the sender entity and the other original receiver entities before correcting the original message, the reply message including a reply information content and an indication of the reply receiver entities,
    sending a further correction message from the original receiver entity at least partially to the reply receiver entities and completely to the missing receiver entities in response to the correction of the original message, the further correction message including the reply information content and an indication of the reply receiver entities and the missing receiver entities, and correcting the reply message for each reply receiver entity according to the further correction message.

9. The method according to claim 1, wherein each message is an e-mail message.

10. A computer program product on a non-transitory computer storage medium for performing a method of exchanging messages among a plurality of data processing systems, when the computer program is executed on a data processing system, the method comprising:
    sending an original message from a sender entity to a set of original receiver entities, the original message including an original information content and an indication of the original receiver entities, sending a correction message from the sender entity at least partially to the original receiver entities and completely to a set of missing receiver entities being missing in the original message, the correction message including the original information content and an indication of the original receiver entities and the missing receiver entities, and correcting the original message for each original receiver entity according to the correction message.

11. A data processing system performing a method of exchanging messages among a plurality of data processing systems, the system including a computer memory for storing a computer program and a processor for executing the computer program to perform the method, when the computer program is executed on the data processing system, the method comprising:

sending an original message from the entity to a set of original receiver entities, the original message including an original information content and an indication of the original receiver entities, sending a correction message from the entity at least partially to the original receiver entities and completely to a set of missing receiver entities being missing in the original message, the correction message including the original information content and an indication of the original receiver entities and the missing receiver entities, receiving a further original message and a further correction message from a further entity of the system, and means correcting the further original message according to the further correction message.

12. The product according to claim 10, wherein the step of correcting the original message includes:

adding an indication of the missing receiver entities to the original message.

13. The product according to claim 10, wherein the step of sending the correction message includes:

sending a reduced version of the correction message to the original receiver entities, the reduced version being obtained from the correction message by removing at least part of the original information content.

14. The product according to claim 10, wherein the correction message further includes an identifier of the original message, the step of correcting the original message including:

identifying the original message to be corrected according to the identifier included in the correction message.

15. The product according to claim 10, wherein the method further comprises:

receiving the original message on each original receiver entity, the step of correcting the original message being performed on the original receiver entity.

16. The product according to claim 15, wherein the method further comprises:

reading the original message, asserting a reading indicator for the original message in response to the reading of the original message, and deasserting the reading indicator in response to the correction of the original message.

17. The product according to claim 15, wherein the method further comprises:

displaying the corrected original message with an indication of the original receiver entities in a first visual mode and an indication of the missing receiver entities in a second visual mode different from the first visual mode.

18. The product according to claim 15, wherein the method further comprises:

sending a reply message as a reply to the original message from the original receiver entity to a set of reply receiver entities including the sender entity and the other original receiver entities before correcting the original message, the reply message including a reply information content and an indication of the reply receiver entities, sending a further correction message from the original receiver entity at least partially to the reply receiver entities and completely to the missing receiver entities in response to the correction of the original message, the further correction message including the reply information content and an indication of the reply receiver entities and the missing receiver entities, and correcting the reply message for each reply receiver entity according to the further correction message.

\* \* \* \* \*